US008803916B1

(12) United States Patent
Paczkowski et al.

(10) Patent No.: US 8,803,916 B1
(45) Date of Patent: Aug. 12, 2014

(54) METHODS AND SYSTEMS FOR AN AUGMENTED REALITY SERVICE DELIVERY PLATFORM

(75) Inventors: Lyle W. Paczkowski, Mission Hills, KS (US); Arun Rajagopal, Leawood, KS (US); Matthew Carl Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 122 days.

(21) Appl. No.: 13/463,756

(22) Filed: May 3, 2012

(51) Int. Cl.
*G06T 11/60* (2006.01)
(52) U.S. Cl.
USPC ........... 345/633; 345/629; 345/632; 709/231; 709/232; 709/233
(58) Field of Classification Search
CPC ....... G06T 19/006; G06T 19/00; G06F 3/011; G06F 3/012; G06F 3/0304
USPC ............................ 345/629–633; 709/230–235
See application file for complete search history.

(56) References Cited

U.S. PATENT DOCUMENTS

| 6,101,381 | A | 8/2000 | Tajima et al. | |
|---|---|---|---|---|
| 2007/0025723 | A1 | 2/2007 | Baudisch et al. | |
| 2009/0021514 | A1 | 1/2009 | Klusza | |
| 2009/0210932 | A1* | 8/2009 | Balakrishnan et al. | 726/5 |
| 2011/0052083 | A1 | 3/2011 | Rekimoto et al. | |
| 2011/0157306 | A1* | 6/2011 | Lin et al. | 348/43 |
| 2011/0279445 | A1 | 11/2011 | Murphy et al. | |
| 2011/0279453 | A1 | 11/2011 | Murphy et al. | |
| 2011/0313953 | A1* | 12/2011 | Lane et al. | 706/12 |
| 2012/0033032 | A1 | 2/2012 | Kankainen | |
| 2012/0105476 | A1 | 5/2012 | Tseng | |
| 2012/0242798 | A1* | 9/2012 | McArdle et al. | 348/46 |
| 2012/0311130 | A1* | 12/2012 | Zadig | 709/224 |
| 2013/0016176 | A1* | 1/2013 | Hines et al. | 348/14.08 |
| 2013/0124326 | A1* | 5/2013 | Huang et al. | 705/14.64 |
| 2013/0162676 | A1* | 6/2013 | Taylor | 345/633 |
| 2013/0187953 | A1* | 7/2013 | Matsumura et al. | 345/633 |
| 2013/0249948 | A1* | 9/2013 | Reitan | 345/633 |

OTHER PUBLICATIONS

FAIPP Office Action dated May 28, 2013, U.S. Appl. No. 13/491,595, filed Jun. 8, 2012.
Final Office Action dated Aug. 1, 2013, U.S. Appl. No. 13/491,595, filed Jun. 8, 2012.
Lyle W. Paczkowski, et al., Patent Application entitled "Methods and Systems for Accessing Crowed Sourced Landscape Images," filed Jun. 8, 2012, U.S. Appl. No. 13/491,595.
FAIPP Pre-Interview Communication dated Apr. 3, 2013, U.S. Appl. No. 13/491,595, filed Jun. 8, 2012.
Advisory Action dated Oct. 7, 2013, U.S. Appl. No. 13/491,595, filed Jun. 8, 2012.
Office Action dated Apr. 1, 2014, U.S. Appl. No. 131491,595, filed Jun. 8, 2012.

* cited by examiner

*Primary Examiner* — Xiao Wu
*Assistant Examiner* — Todd Buttram

(57) ABSTRACT

In some embodiments, a method is provided. The method includes receiving an augmented reality request from a mobile access terminal. The method also includes identifying a context for the augmented reality request and a feature set supported by the mobile access terminal associated with the augmented reality request. The method also includes mapping the identified feature set and the context to a subset of available augmented reality operations. The method also includes executing the subset of available augmented reality operations to generate augmented reality content corresponding to the augmented reality request. The method also includes streaming the augmented reality content to the mobile access terminal associated with the augmented reality request for playback.

15 Claims, 7 Drawing Sheets

METHODS AND SYSTEMS FOR AN AUGMENTED REALITY SERVICE DELIVERY PLATFORM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Augmented reality (AR) refers to a direct or indirect view of the physical, real-world environment whose elements (e.g., sound, graphics) are augmented based on computer-generated sensory input (e.g., accelerometer or GPS data). In this manner, AR enhances one's current perception of relation. By contrast, virtual reality replaces the real world with a simulated one.

AR is generally performed as an application being executed on a portable device to display information in context with environmental elements. For example, an AR application running on a portable device may be used in a golf context to show distances to a fairway or green. Further, an AR application running on a portable device may be used in an outdoor context to show compass parameters, position information, or points of interest relative to the physical environment in which one resides. Further, an AR application running on a portable device may be used in a gaming context, in which objects in the physical environment in which one resides becomes part of a game experience. With AR, computer-generated graphics (e.g., words and/or lines) are often overlaid onto the real-world view provided by a camera view of a portable device.

Implementation of AR is computationally intensive and thus device resources (e.g., processor cycles and memory) may be overwhelmed during AR operations. In such case, use of AR may negatively affect other applications or operations of a portable device. Further, the computationally-intensive aspect of AR means it is often limited to only the highest cost/performance chipsets and devices.

SUMMARY

In some embodiments, a method comprises receiving an augmented reality request from a mobile access terminal. The method also comprises identifying a context for the augmented reality request and a feature set supported by the mobile access terminal associated with the augmented reality request. The method also comprises mapping the identified feature set and the context to a subset of available augmented reality operations. The method also comprises executing the subset of available augmented reality operations to generate augmented reality content corresponding to the augmented reality request, and streaming the augmented reality content to the mobile access terminal associated with the augmented reality request for playback.

In some embodiments, an augmented reality service delivery platform system is provided. The augmented reality service delivery platform system comprises an identification component to receive an augmented reality request from a mobile access terminal, to identify a context for the augmented reality request, and to identify a feature set supported by the mobile access terminal associated with the augmented reality request. The augmented reality service delivery platform system also comprises a mapping component to map the identified feature set and the context to a subset of available augmented reality applications. The augmented reality service delivery platform system also comprises an interlacing component to execute the subset of available augmented reality applications and to generate augmented reality content corresponding to the augmented reality request. The augmented reality service delivery platform system also comprises a streaming component to stream the augmented reality content to the mobile access terminal associated with the augmented reality request for playback.

In some embodiments, an augmented reality service delivery platform server is provided. The augmented reality service delivery platform server comprises a processor and a non-transitory computer-readable medium in communication with the processor. The non-transitory computer-readable medium stores augmented reality service delivery platform instructions that, when executed, cause the processor to receive an augmented reality request from a mobile access terminal. The augmented reality service delivery platform instructions, when executed, also cause the processor to identify a context for the augmented reality request and to identify a feature set supported by the mobile access terminal associated with the augmented reality request. The augmented reality service delivery platform instructions, when executed, also cause the processor to map the identified feature set and the context to a subset of available augmented reality operations. The augmented reality service delivery platform instructions, when executed, also cause the processor to interlace an image based on the subset of available augmented reality operations to generate augmented reality content corresponding to the augmented reality request. The augmented reality service delivery platform instructions, when executed, also cause the processor to stream the augmented reality content to the mobile access terminal associated with the augmented reality request for playback.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
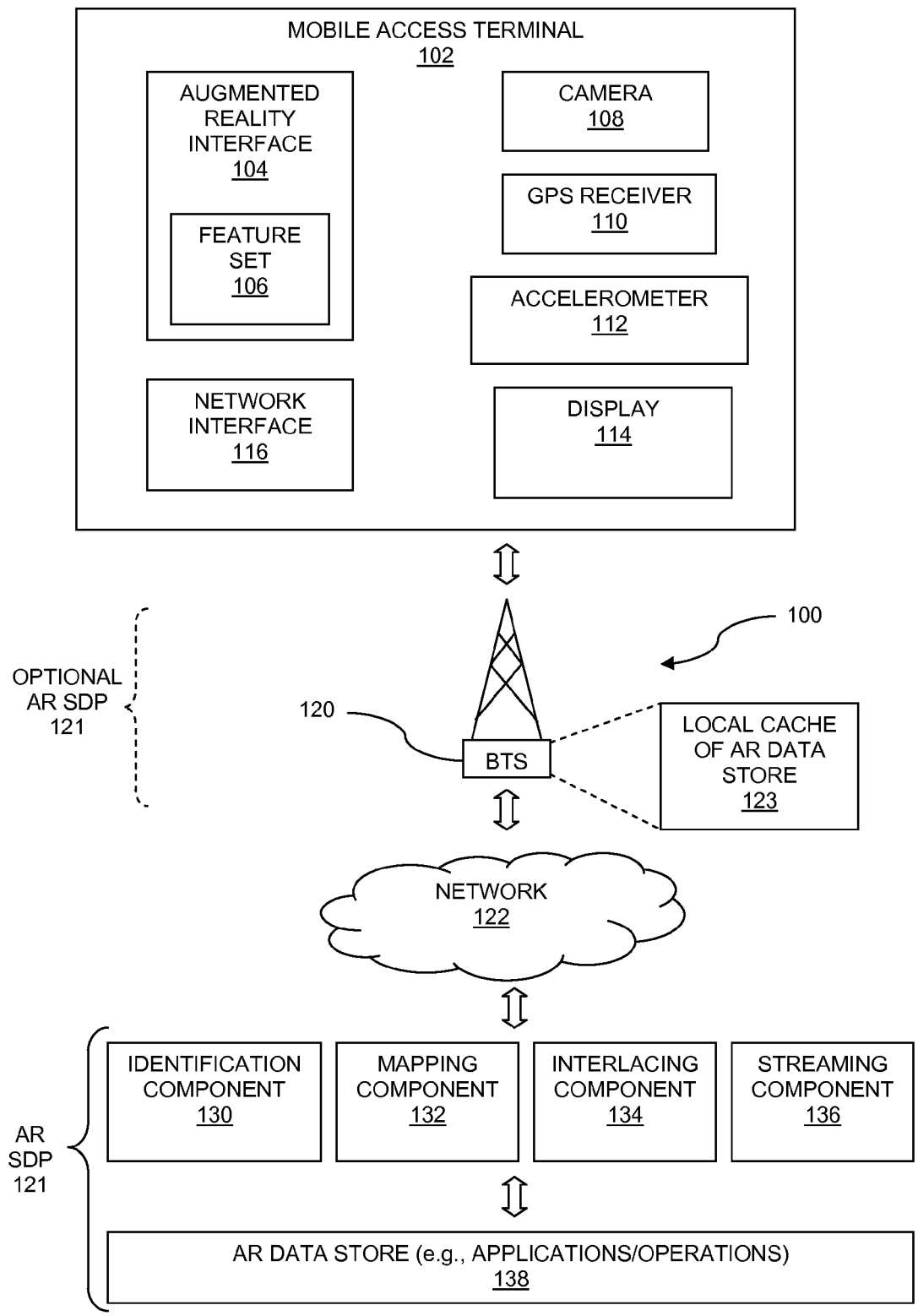
FIG. 1 illustrates a system in accordance with embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Augmented reality (AR) applications are often specific to a particular use (e.g., a golf application, a compass application, or a gaming application) and are separately installed on a device. Further, each AR application may not be compatible with the various types of portable devices that are available to consumers. These issues prevent the widespread deployment of AR technology on portable consumer devices.

Embodiments of the disclosure are directed to a network-based augmented reality (AR) service delivery platform compatible with different types of mobile access terminals having different capabilities. With the AR service delivery platform, at least some operations to prepare AR content are performed by at least one server on a network, and then the AR content is delivered to an AR interface being executed by a mobile access terminal for playback. The AR interface enables various types of AR requests and the presentation of corresponding AR content without requiring a user to actively interact with multiple AR applications. In other words, the AR interface either supports available AR content provided by the AR service delivery platform or acts as an intermediary to access AR applications supported by the AR service delivery platform. In this manner, at least some of the computational burden of preparing AR content can be transferred from mobile access terminals to the AR service delivery platform, and the management of AR presentations on a mobile access terminal is facilitated.

In at least some embodiments, most AR manipulations are performed by the AR service delivery platform and then AR content is streamed to each mobile access terminal for playback. To support AR operations, mobile access terminals may provide some information to the AR service delivery platform in the form of an AR request. For example, a mobile access terminal may send an AR request to the AR service delivery platform, where the AR request includes information such as a picture frame (or frames), global positioning system (GPS) data, and accelerometer data. In response, the AR service delivery platform performs various operations to build the AR content to be streamed to the mobile access terminal that sent the AR request. As disclosed herein the AR service delivery platform may identify a context for an augmented reality request and a feature set supported by the mobile access terminal associated with the augmented reality request. The identified feature set and the context are then mapped to a subset of available augmented reality operations supported by the AR service delivery platform. The subset of available augmented reality operations are executed to generate augmented reality content corresponding to the augmented reality request, and the augmented reality content is transmitted to the mobile access terminal associated with the augmented reality request for playback.

In accordance with at least some embodiments, the AR service delivery platform improves presentation of AR content on mobile access terminals with limited performance capabilities, since the mobile access terminal only needs to render streaming AR content provided by the AR service delivery platform. This allows lower-end devices with lesser chipsets to provide AR experiences, and thus the availability and monetization of AR is broadened across many types of mobile access terminals. Providing an AR service delivery platform also simplifies the efforts of AR application developers to develop and store an AR application on a mobile access terminal because the requirements and feature set of AR applications is reduced for an AR service delivery platform environment. With simplified AR application requirements, proliferation of AR is facilitated because memory space requirements on the mobile access terminal and the upfront investment needed to develop AR applications is reduced.

FIG. 1 illustrates a system 100 in accordance with embodiments of the disclosure. As shown, the system 100 comprises a mobile access terminal 102 in communication with an AR service delivery platform 121 via a base station 120. The mobile access terminal 102 represents, for example, a cellular phone, a smart phone, a personal digital assistant (PDA), a tablet computer, wearable display goggles coupled to a wireless communication device, or another mobile device. In FIG. 1, the mobile access terminal 102 is shown to comprise an AR interface 104 configured to present AR content received from the AR service delivery platform 121. The AR interface 104 comprises a feature set 106 that defines the types of AR content that can be presented. The feature set 106 may vary for different mobile access terminals and/or may vary over time for a particular mobile access terminal. For example, the feature set 106 may correspond to sensor compatibilities, screen resolution, network speed, and/or rendering capabilities of the mobile access terminal 102. In other words, the feature set 106 of the AR interface 104 is based on the performance characteristics of other components of the mobile access terminal such as camera 108, GPS receiver 110, accelerometer 112, display 112, and network interface 116. Other features of the mobile access terminal 102 that may be considered with the feature set 106 include a microphone, a speaker, an external port controller, and software applications that reside on the mobile access terminal 102. With an external port controller, the mobile access terminal 102 may communicate with another device or appliance such that AR is used to control the other device or appliance.

In accordance with embodiments, the camera 108 operates to record video and/or still photographs using an electronic image sensor. The GPS receiver 110 provides location and time information based on GPS satellites. In alternative embodiments, another satellite-enabled self-location function is used instead of GPS. The accelerometer 112 is a sensor-based tool to measure mobile access terminal parameters such as acceleration, movement, temperature, light intensity, and orientation. The display 114 corresponds to a liquid crystal display (LCD) screen or other display technology. The display 114 may be a touch screen in some embodiments. Further, the resolution and color scheme of the display 114 may vary for different mobile access terminals. The network interface 116 corresponds to one or more wireless technology communication modules to enable the mobile access terminal 102 to transmit information to or receive information from BTS 120.

As an example, the mobile access terminal 102 may transmit an AR request to the BTS 120 using the AR interface 104. The AR interface 104 may generate AR requests upon request from a user. Additionally or alternatively, the AR interface 104 may generate AR requests using predetermined settings of the AR interface 104. The predetermined settings may be determined based on a selection of available settings by a user, a selection of AR interests by a user, a geographic location of the mobile access terminal 102, or user profile information that identifies user interests.

Upon reception of an AR request, the BTS 120 forwards the AR request to the AR service delivery platform 121 via the network 122 to build AR content corresponding to the AR request. In some embodiments, the BTS 120 is part of the AR service delivery platform 121 and may perform at least some operations to build AR content corresponding to the AR request. Although not required, the network 122 may also be part of the AR service delivery platform 121 or is maintained by the same entity providing the AR service delivery platform 121. In FIG. 1, the operations of the AR service delivery platform 121 are performed by an identification component 130, a mapping component 132, an interlacing component 134, and a streaming component 136. In some embodiments, each of the components 130, 132, 134, 136 corresponds to a separate computing/memory resource (e.g., a server). In such case, each of the components 130, 132, 134, 136 may be optimized to perform their particular function. Alternatively, the components 130, 132, 134, 136 may be hardware components or software components of a single server. In either case, the components 130, 132, 134, 136 may have access to at least one AR data store 138 that supports AR operations.

In at least some embodiments, the identification component 130 is configured to receive an augmented reality request from the mobile access terminal 102, to identify a context for the augmented reality request, and to identify the feature set 106 supported by the mobile access terminal 102 associated with the augmented reality request. The mapping component 132 is configured to map the identified feature set 106 and the context to a subset of available augmented reality applications or operations. The context may be determined, for example, from information (a dataset) provided with the AR request such as camera stills/video, GPS data, and/or accelerometer data. The interlacing component 134 is configured to execute the subset of available augmented reality applications and to generate augmented reality content corresponding to the augmented reality request. The streaming component 136 is configured to stream the augmented reality content to the mobile access terminal 102 associated with the augmented reality request for playback. As an example, if the AR request comprises a camera image, the AR content provided by the AR service delivery platform 121 for playback may comprise the camera image interlaced with AR image content such as words, lines, identifiers, gaming graphics, or other AR content. Similarly, if the AR request comprises a camera video, the AR content provided by the AR service delivery platform 121 for playback may comprise the camera video interlaced with AR image content such as words, lines, identifiers, gaming graphics, or other AR content. Audible sounds also may be included with AR content for playback by the mobile access terminal 102.

In at least some embodiments, the AR service delivery platform 121 is configured to provide AR content in response to an AR request in accordance with a predefined AR latency threshold. The predefined AR latency threshold balances the costs of providing AR content with the AR service delivery platform while maintaining a suitable streaming speed for AR content that promotes widespread and ongoing use of AR by mobile access terminals. For example, the design and operation of the identification component 130, the mapping component 132, the interlacing component 134, and the streaming component 136 may be based on the predefined AR latency threshold. In some embodiments, the predefined AR latency threshold is achieved for the AR service delivery platform 121 due to hardware of the interlacing component 134 being optimized to interlace images/video with augmented reality content. Additionally or alternatively, the predefined AR latency threshold is achieved for the AR service delivery platform 121 due to a synchronization protocol implemented by at least one of the identification component 130, the mapping component 132, the interlacing component 134, and the streaming component 136 to expedite alignment of the augmented reality request with the augmented reality content. Additionally or alternatively, the predefined AR latency threshold is achieved for the AR service delivery platform 121 based on localized caching used by the identification component 130 to expedite identifying the context for the augmented reality request and the feature set 106 supported by the mobile access terminal 102 associated with the augmented reality request. A local cache 123 may be stored, for example, by the BTS 120 or a high-speed data store nearby the BTS 120. In some embodiments, the local cache 123 stores images used by the identification component 130. More specifically, the identification component 130 may compare a picture frame included with the augmented reality request to the images in the local cache 123 to expedite identifying the context for the augmented reality request. The local cache 123 may likewise store other AR applications/operations used to build and stream AR content to the mobile access device 102 in response to an AR request.

Figure 2:
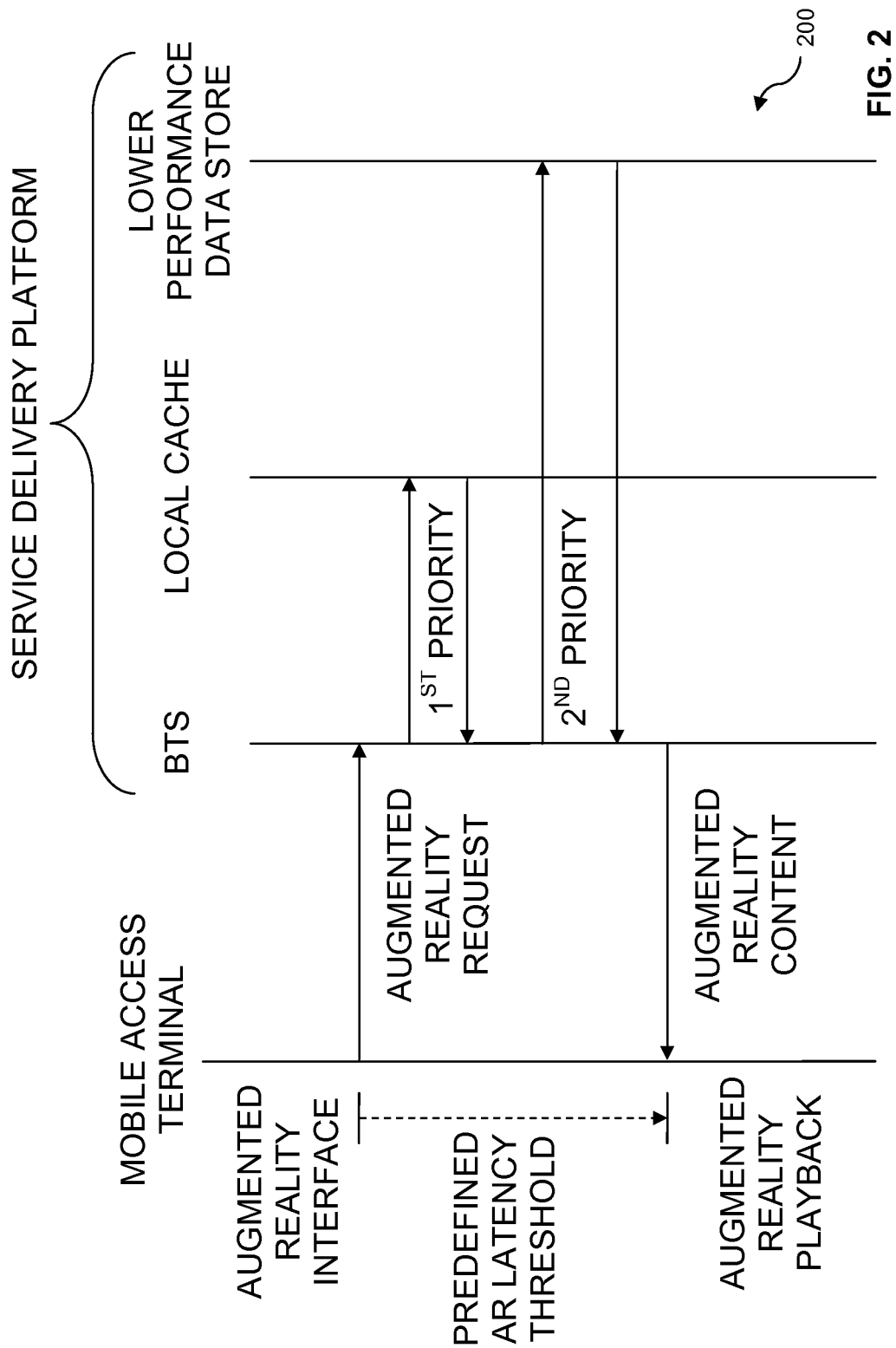
FIG. 2 illustrates a chart showing operations of the system of FIG. 1 in accordance with embodiments of the disclosure.

FIG. 2 illustrates a chart 200 showing operations of the system of FIG. 2 in accordance with embodiments of the disclosure. As shown in chart 200, an AR request is initiated by an AR interface of a mobile access terminal. The AR request is received by an AR service delivery platform that includes a BTS, a local cache, and a data store. Upon receipt of the AR request, the AR service delivery platform operates to build AR content corresponding to the AR request. As shown, the AR service delivery platform preferably performs AR operations to build the AR content using local cache. If local cache is not available or is otherwise limited, the AR service delivery platform performs AR operations to build the AR content using a lower performance data store. Once the AR content is ready, the BTS streams the AR content to the mobile access terminal for playback.

In various embodiments, the AR service delivery platform 121 manages AR content delivery for many mobile access terminals 102. In such case, the AR service delivery platform 121 may vary its operations depending on the capabilities of mobile access terminals 102 and/or the amount of AR request traffic. For example, the identification component 130 may identify that the mobile access terminal 102 corresponds to a type of device that can effectively perform some or all operations to build AR content. In such case, the AR service delivery platform 121 responds to an AR request by denying AR service (the mobile access terminal 102 may still be able to generate its own AR content) or with instructions regarding which operations will be performed by the mobile access terminal 102 and which operations will be performed by the AR service delivery platform 121. The AR service delivery platform 121 then builds fractional AR content to stream to a corresponding mobile access terminal 102. Upon receipt, the mobile access terminal 102 combines the fractional AR content from the AR service delivery platform 121 with other fractional AR content prepared by the mobile access terminal 102 for playback via the AR interface 104.

As another example, the identification component 130 may identify that AR traffic exceeds a threshold. In such case, the AR service delivery platform 121 responds to an AR request by denying AR service (the mobile access terminal 102 may still be able to generate its own AR content) or with instructions regarding which operations will be performed by the mobile access terminal 102 and which operations will be performed by the AR service delivery platform 121. In some embodiments, the AR service delivery platform 121 may deny AR service to those mobile access terminals 102 that are capable of generating their own AR content. Alternatively, the AR service delivery platform 121 may deny AR service according to a predetermined customer-tier scheme (e.g., device or subscription-based service). In response to heavy AR traffic conditions, the AR service delivery platform 121 is able build fractional AR content to stream to corresponding mobile access terminals 102. Upon receipt, the mobile access terminal 102 combines the fractional AR content from the AR service delivery platform 121 with other fractional AR content prepared by the mobile access terminal 102 for playback via the AR interface 104. Alternatively, the AR service delivery platform 104 may be configured to perform all AR operations to build AR content, but exceeds the predefined AR latency threshold for some or all mobile access devices. In such case, the quality (latency) of AR service may be based on a predetermined customer-tier scheme (e.g., device or subscription-based service).

Figure 3:
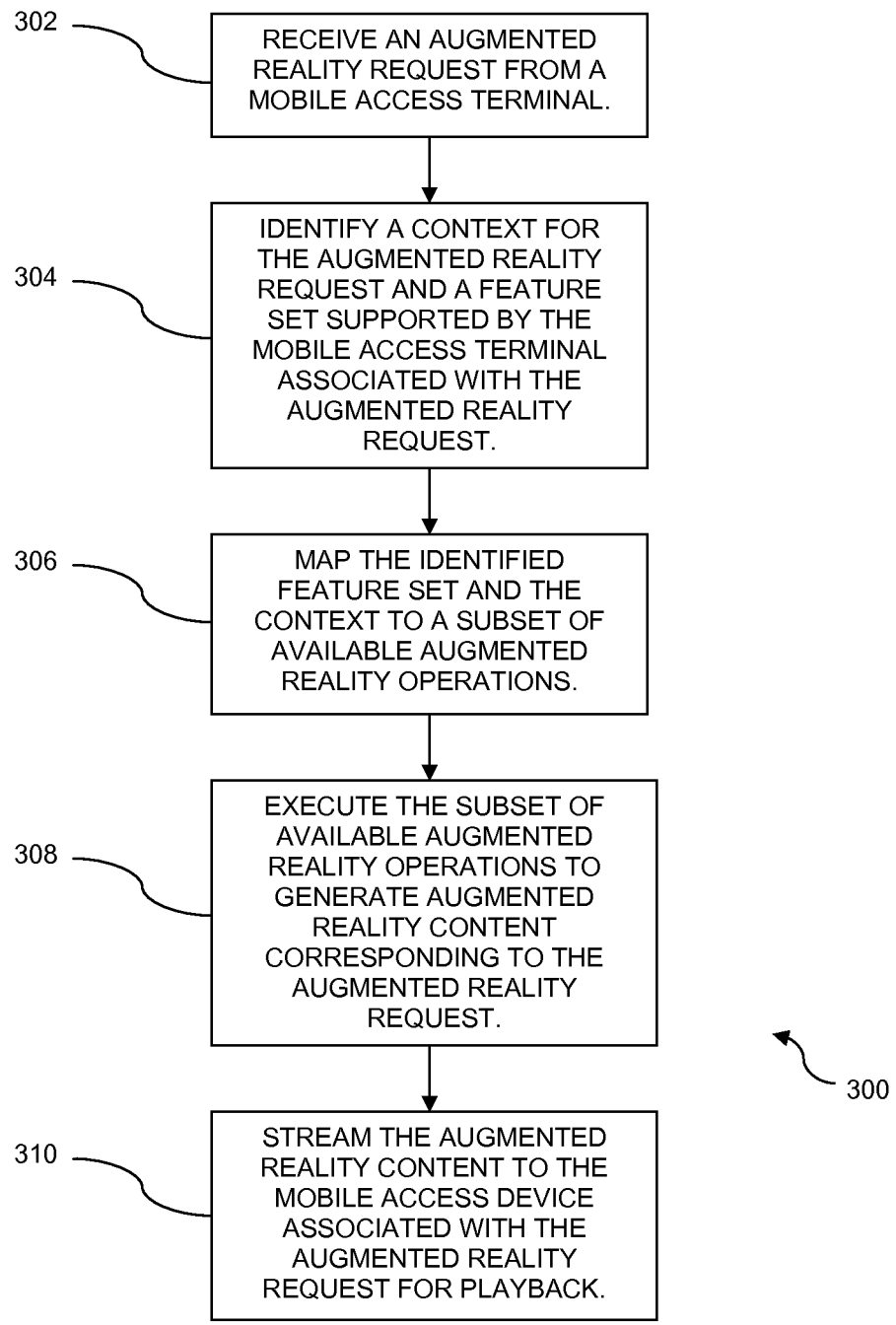
FIG. 3 illustrates a method in accordance with embodiments of the disclosure.

FIG. 3 illustrates a method 300 in accordance with embodiments of the disclosure. The method 300 may be performed by AR service delivery platform components such as those disclosed herein. As shown, the method 300 comprises receiving an AR request from a mobile access terminal (block 302). In some embodiments, receiving the AR request comprises receiving a dataset comprising a picture frame, a location identifier (e.g., GPS data), and accelerometer data.

A context and a feature set supported by the mobile access terminal associated with the AR request are identified at block 304. The identified feature set and context are then mapped to a subset of available AR operations supported by the AR service delivery platform (block 306). Execution of the subset of available AR operations generates AR content corresponding to the AR request at block 308. Finally, the AR content is streamed to the mobile access terminal associated with the AR request for playback (block 310).

In some embodiments, the receiving step, the identifying step, the mapping step, the executing step, and the streaming step of method 300 are performed in accordance with a predefined AR latency threshold. The predefined AR latency threshold may be determined based on experiments or estimates to determine a suitable latency that does not negatively affect the interaction of a user with AR content. Without limitation to other embodiments, the predefined AR latency threshold may be between 0.1-0.5 seconds (i.e., 2 to 10 AR content frames per second). In some embodiments, the predefined AR latency threshold varies for different quality of service (QoS) tiers applied to different devices, different user accounts, or different groups (premium tier, business tier, or economy tier). As an example, the predefined augmented reality latency threshold may be set based on high-performance hardware for interlacing images with augmented reality content. Additionally or alternatively, the predefined augmented reality latency threshold may be set based on a synchronization protocol to align the augmented reality request with the streamed augmented reality content. Additionally or alternatively, the predefined augmented reality latency threshold may be set based on a local caching scheme for images used to determine the context of the augmented reality request.

In various embodiments, the AR service delivery platform manages AR content delivery for many mobile access terminals. In such case, the method 300 may deny AR service or vary its operations depending on the capabilities of mobile access terminals and/or the amount of AR request traffic. For example, the identifying step may identify that the mobile access terminal 102 corresponds to a type of device that can effectively perform some or all operations to build AR content. In such case, the method 300 may respond to an AR request by denying AR service (the mobile access terminal may still be able to generate its own AR content) or with instructions regarding which operations will be performed by the mobile access terminal and which operations will be performed by the AR service delivery platform. The AR service delivery platform then builds fractional AR content to stream to a corresponding mobile access terminal. Upon receipt, the mobile access terminal combines the fractional AR content from the AR service delivery platform with other fractional AR content prepared by the mobile access terminal for playback via the AR interface. In some embodiments, the AR service delivery platform may deny AR service according to a predetermined customer-tier scheme (device or subscription-based service). Alternatively, in response to heavy AR request traffic, the AR service delivery platform may be configured to perform all AR operations to build AR content, but exceeds the predefined AR latency threshold for some or all mobile access devices. In such case, the quality (latency) of AR service may be based on a predetermined customer-tier scheme (device or subscription-based service). Without limitation to other embodiments, the predefined AR latency threshold may be between 0.1-0.5 seconds (i.e., 2 to 10 AR content frames per second). In some embodiments, the predefined AR latency threshold varies for different quality of service (QoS) tiers applied to different devices, different user accounts, or different groups (premium tier, business tier, or economy tier) and may vary in response to heavy AR request traffic conditions. In general, the AR service delivery platform may be configured to deny AR service or increase AR service latency for one or more tiers of devices in response to heavy AR request traffic conditions.

Figure 4:
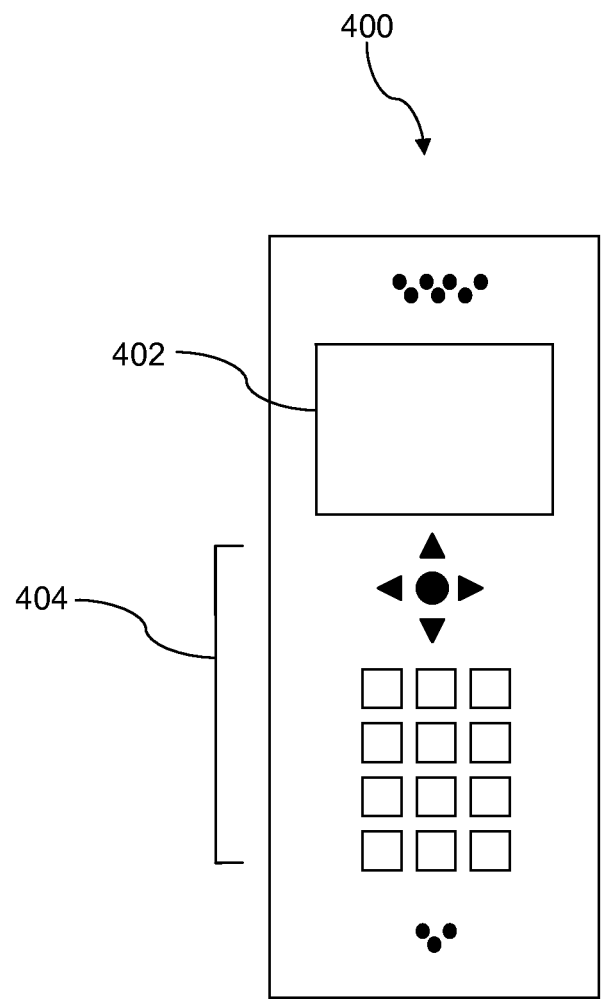
FIG. 4 illustrates a mobile access terminal in accordance with embodiments of the disclosure.

FIG. 4 illustrates a mobile access terminal 400 in accordance with embodiments of the disclosure. The mobile access terminal 400 of FIG. 4 is operable for implementing aspects of the present disclosure, but the present disclosure should not be limited to these implementations. The mobile access terminal 400 may take various forms including a wireless handset, a pager, a personal digital assistant (PDA), a gaming device, or a media player. The mobile access terminal 400 includes a display 402 and a touch-sensitive surface and/or keys 404 for input by a user. The mobile access terminal 400 may present options for the user to select, controls for the user to actuate, and/or cursors or other indicators for the user to direct. The mobile access terminal 400 may further accept data entry from the user, including numbers to dial or various parameter values for configuring the operation of the handset. The mobile access terminal 400 may further execute one or more software or firmware applications in response to user commands. These applications may configure the mobile access terminal 400 to perform various customized functions in response to user interaction. Additionally, the mobile access terminal 400 may be programmed and/or configured over-the-air, for example from a wireless base station, a wireless access point, or a peer mobile access terminal 400. The mobile access terminal 400 may execute a web browser application which enables the display 402 to show a web page. The web page may be obtained via wireless communications with a base transceiver station, a wireless network access node, a peer mobile access terminal 400 or any other wireless communication network or system.

Figure 5:
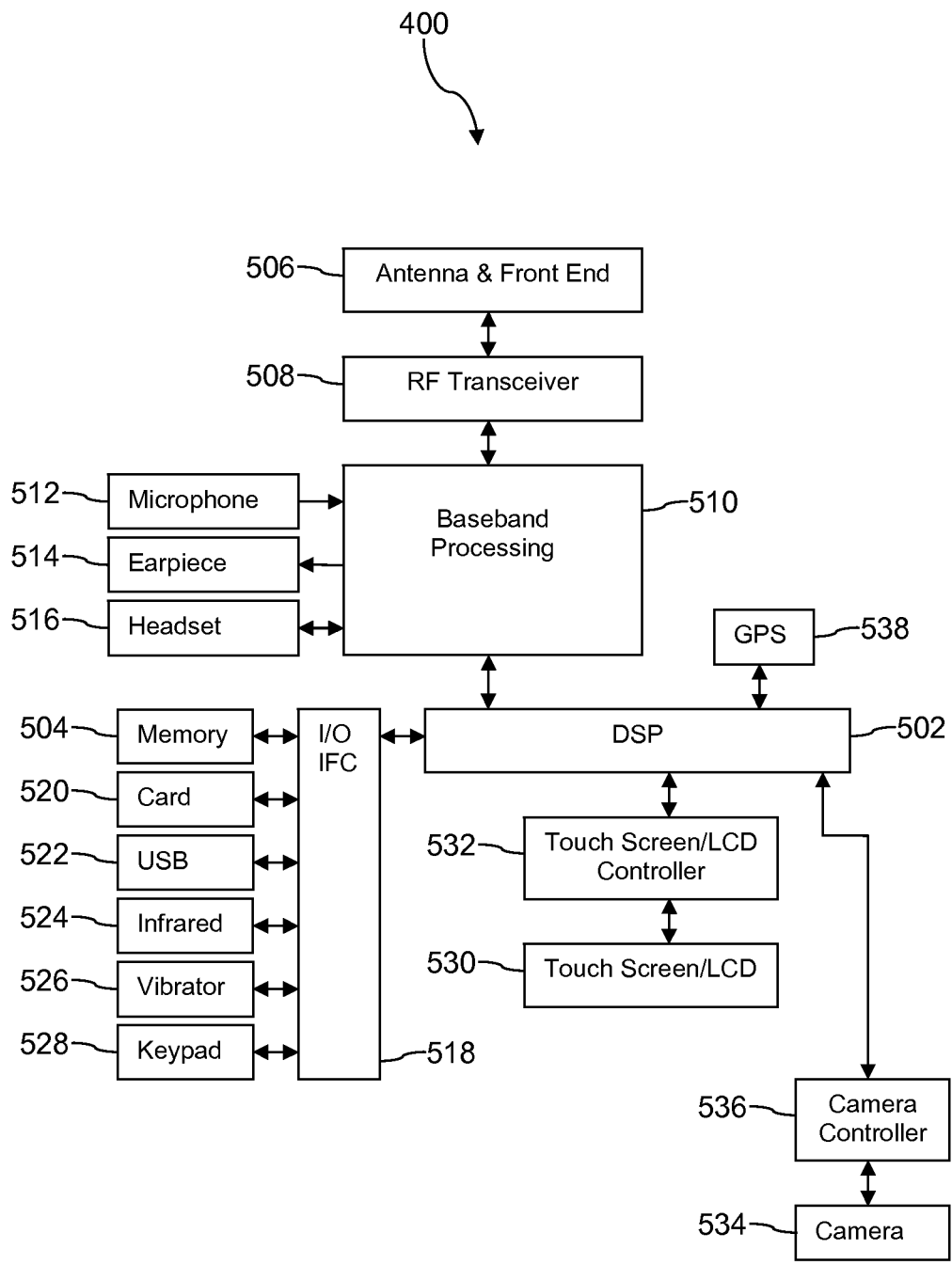
FIG. 5 shows a block diagram of the mobile access terminal of FIG. 4 in accordance with embodiments of the disclosure.

FIG. 5 shows a block diagram of the mobile access terminal 400. While a variety of known components of handsets are depicted, in an embodiment a subset of the listed components and/or additional components not listed may be included in the mobile device 400. The mobile access terminal 400 includes a digital signal processor (DSP) 502 and a memory 504. As shown, the mobile access terminal 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile access terminal 400 may include another kind of display that does not provide a touch sensitive screen. In an embodiment, the DSP 502 may communicate directly with the memory 504 without passing through the input/output interface 518. Additionally, in an embodiment, the mobile access terminal 400 may comprise other peripheral devices that provide other functionality.

The DSP 502 or some other form of controller or central processing unit operates to control the various components of the mobile access terminal 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502. In some embodiments, the DSP 502 includes or is in communication with a secure element or a trust zone of applications/storage to support trusted AR operations.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile access terminal 400 to function as a peripheral device to exchange information with a personal computer or other computer system. The infrared port 524 and other optional ports such as a Bluetooth® interface or an IEEE 802.11 compliant wireless interface may enable the mobile access terminal 400 to communicate wirelessly with other nearby handsets and/or wireless base stations.

The keypad 528 couples to the DSP 502 via the interface 518 to provide one mechanism for the user to make selections, enter information, and otherwise provide input to the mobile access terminal 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile access terminal 400 to determine its position.

Figure 6A:
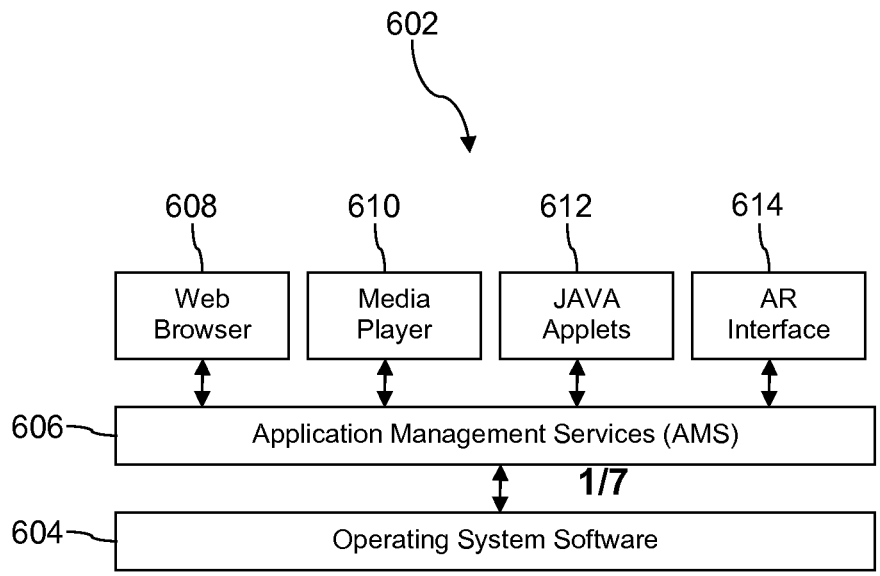
FIGS. 6A and 6B illustrate software environments that may be implemented by a mobile access terminal in accordance with embodiments.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile access terminal 400. Also shown in FIG. 6A are a web browser application 608, a media player application 610, JAVA applets 612, and AR interface 614 (corresponding to AR interface 104). The web browser application 608 may be executed by the mobile access terminal 400 to browse content and/or the Internet, for example when the mobile access terminal 400 is coupled to a network via a wireless link. The web browser application 608 may permit a user to enter information into forms and select links to retrieve and view web pages. The media player application 610 may be executed by the mobile access terminal 400 to play audio or audiovisual media. The JAVA applets 612 may be executed by the mobile access terminal 400 to provide a variety of functionality including games, utilities, and other functionality. The AR interface 614 may be executed by the mobile access terminal 400 to initiate AR requests and to playback AR content. The AR content is provided by an AR service delivery platform as described herein. Alternatively, some AR content or fractional AR content may be provided by the mobile access terminal 400 as described herein.

Figure 6B:
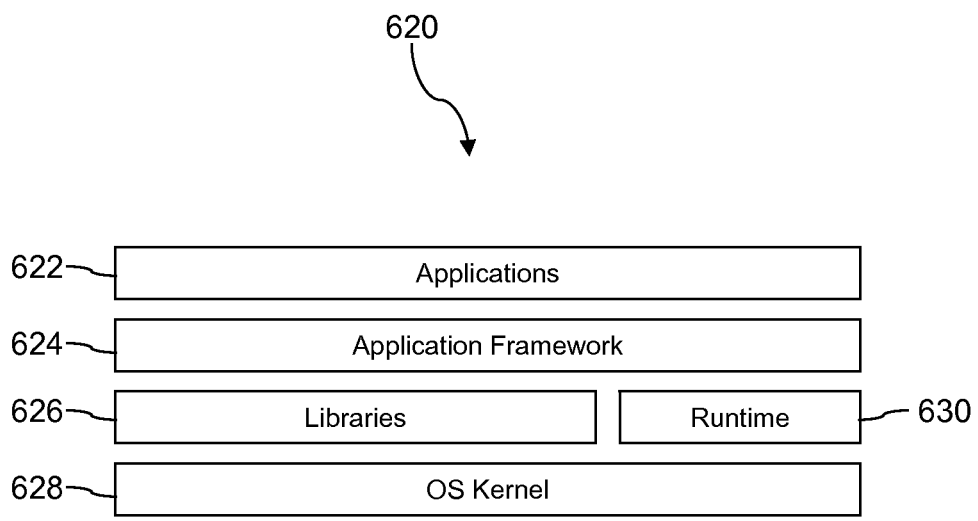

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
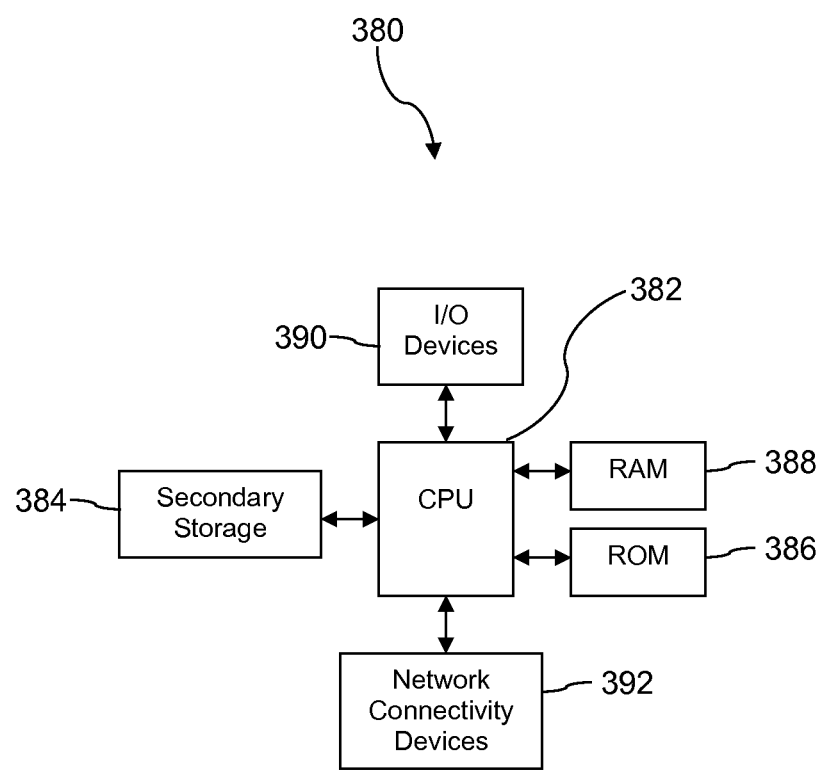
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

In at least some embodiments, the computer system 380 corresponds to an augmented reality service delivery platform server with a processor (e.g., processor 382) and a non-transitory computer-readable medium in communication with the processor. The non-transitory computer-readable medium stores AR service delivery platform instructions that, when executed, cause the processor to receive an augmented reality request from a mobile access terminal, to identify a context for the augmented reality request, and to identify a feature set supported by the mobile access terminal associated with the augmented reality request. The AR service delivery platform instructions, when executed, further cause the processor to map the identified feature set and the context to a subset of available augmented reality operations and to interlace an image based on the subset of available augmented reality operations to generate augmented reality content corresponding to the augmented reality request. The AR service delivery platform instructions, when executed, further cause the processor to stream the augmented reality content to the mobile access terminal associated with the augmented reality request for playback.

In some embodiments, the AR service delivery platform instructions, when executed, further cause the processor to identify the context for the augmented reality request based on a picture frame, a location identifier, and accelerometer data included with the augmented reality request. The AR service delivery platform instructions, when executed, also may cause the processor to identify the context for the augmented reality request based on a localized caching scheme for images. The AR service delivery platform instructions, when executed, may also cause the processor to generate the augmented reality output by interlacing a camera image included with the augmented reality request with augmented reality image content. The AR service delivery platform instructions, when executed, may also cause the processor to generate the augmented reality output by interlacing a video included with the augmented reality request with augmented reality image content. The augmented reality service delivery platform instructions, when executed, further cause the processor to perform synchronization operations to synchronize the augmented reality content with the augmented reality request.

In some embodiments, AR service delivery platform instructions, when executed, further cause the processor to respond to an augmented reality request with a service denial response or with fractional augmented reality content upon identifying that the mobile access terminal is a type of mobile access terminal that is capable of generating the augmented reality content within a predefined augmented reality latency threshold. Additionally, the AR service delivery platform instructions, when executed, further cause the processor to respond to an augmented reality request with a service denial response or with fractional augmented reality content upon identifying a heavy augmented reality request traffic condition. Additionally, the AR service delivery platform instructions, when executed, further cause the processor to respond to an augmented reality request with a augmented reality content that does not comply with a predefined AR latency threshold when a heavy augmented reality request traffic condition exists. In some embodiments, certain mobile access terminals may receive AR service during heavy AR request traffic conditions while other are denied AR service based on a subscription plan or other criteria.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
    receiving an augmented reality request from a mobile access terminal;
    identifying a context for the augmented reality request and a feature set supported by the mobile access terminal associated with the augmented reality request;
    mapping the identified feature set and the context to a subset of available augmented reality operations;
    executing the subset of available augmented reality operations to generate augmented reality content corresponding to the augmented reality request;
    streaming the augmented reality content to the mobile access terminal associated with the augmented reality request for playback, wherein said receiving, said identifying, said mapping, said executing, and said streaming are performed in accordance with a predefined augmented reality latency threshold; and
    setting the predefined augmented reality latency threshold based on a local caching scheme for images used to determine the context of the augmented reality request.

2. The method of claim 1, wherein receiving the augmented reality request comprises receiving a dataset comprising a picture frame, a location identifier, and accelerometer data.

3. The method of claim 1, wherein the setting the predefined augmented reality latency threshold is further based on high-performance hardware for interlacing images with augmented reality content.

4. The method of claim 1, wherein the setting the predefined augmented reality latency threshold is further based on a synchronization protocol to align the augmented reality request with the streamed augmented reality content.

5. An augmented reality service delivery platform system comprising:
   an identification component to receive an augmented reality request from a mobile access terminal, to identify a context for the augmented reality request, and to identify a feature set supported by the mobile access terminal associated with the augmented reality request;
   a mapping component to map the identified feature set and the context to a subset of available augmented reality applications;
   an interlacing component to execute the subset of available augmented reality applications and to generate augmented reality content corresponding to the augmented reality request; and
   a streaming component to stream the augmented reality content to the mobile access terminal associated with the augmented reality request for playback,
   wherein the identification component, the mapping component, the interlacing component, and the streaming component operate in accordance with a predefined augmented reality latency threshold, and
   wherein the predefined augmented reality latency threshold is met based on localized caching used by the identification component to expedite identifying the context for the augmented reality request and the feature set supported by the mobile access terminal associated with the augmented reality request.

6. The system of claim 5, wherein the received augmented reality request comprises a dataset comprising a picture frame, a location identifier, and accelerometer data.

7. The system of claim 5, wherein the augmented reality request comprises a camera image and wherein the augmented reality content comprises the camera image interlaced with augmented reality image content.

8. The system of claim 5, wherein the augmented reality request comprises a video and wherein the augmented reality content comprises the video interlaced with augmented reality image content.

9. The system of claim 5, wherein the predefined augmented reality latency threshold is met further based on hardware of the interlacing component being optimized to interlace images with augmented reality content.

10. The system of claim 5, wherein the predefined augmented reality latency threshold is met further based on at least one of the identification component, the mapping component, the interlacing component, and the streaming component implementing a synchronization protocol to expedite alignment of the augmented reality request with the augmented reality content.

11. The system of claim 5, wherein the localized caching stores images and wherein the identification component compares a picture frame included with the augmented reality request to the images in the localized caching to identify the context for the augmented reality request.

12. An augmented reality service delivery platform server, comprising:
   a processor; and
   a non-transitory computer-readable medium in communication with the processor and storing augmented reality service delivery platform instructions that, when executed, cause the processor to:
      receive an augmented reality request from a mobile access terminal,
      identify a context for the augmented reality request,
      identify a feature set supported by the mobile access terminal associated with the augmented reality request,
      map the identified feature set and the context to a subset of available augmented reality operations,
      interlace an image based on the subset of available augmented reality operations to generate augmented reality content corresponding to the augmented reality request,
      stream the augmented reality content to the mobile access terminal associated with the augmented reality request for playback, and
      in response to receiving a second augmented reality request, send a service denial response or fractional augmented reality content based upon at least one of identifying that the mobile access terminal is a type of mobile access terminal that is capable of generating the augmented reality content associated with the second augmented reality request within a predefined augmented reality latency threshold or identifying a heavy augmented reality request traffic condition.

13. The augmented reality service delivery platform server of claim 12, wherein the augmented reality service delivery platform instructions, when executed, further cause the processor to identify the context for the augmented reality request based on a picture frame, a location identifier, and accelerometer data included with the augmented reality request.

14. The augmented reality service delivery platform server of claim 12, wherein the augmented reality service delivery platform instructions, when executed, further cause the processor to identify the context for the augmented reality request based on a localized caching scheme for images.

15. The augmented reality service delivery platform server of claim 12, wherein the augmented reality service delivery platform instructions, when executed, further cause the processor to perform synchronization operations to synchronize the augmented reality content with the augmented reality request.

* * * * *